(12) United States Patent
Henson

(10) Patent No.: US 8,255,542 B2
(45) Date of Patent: Aug. 28, 2012

(54) METHOD AND SYSTEM FOR FOR RECONSTRUCTING A SESSION BY INTEGRATING METADATA AND DATA OF A SESSION

(75) Inventor: Mark Edward Henson, Blowing Rock, NC (US)

(73) Assignee: Nice Systems Ltd., Raanana (IL)

( * ) Notice: Subject to any disclaimer, the term of this patent is extended or adjusted under 35 U.S.C. 154(b) by 141 days.

(21) Appl. No.: 12/784,067

(22) Filed: May 20, 2010

(65) Prior Publication Data
US 2011/0289220 A1 Nov. 24, 2011

(51) Int. Cl.
*G06F 15/16* (2006.01)
(52) U.S. Cl. ........ 709/227; 709/228
(58) Field of Classification Search .......... 709/227, 709/228
See application file for complete search history.

(56) References Cited

U.S. PATENT DOCUMENTS

| | | | |
|---|---|---|---|
| 2008/0071717 A1 | 3/2008 | Nisani et al. | |
| 2009/0013078 A1* | 1/2009 | Bencheikh | 709/227 |
| 2010/0231714 A1* | 9/2010 | Flores et al. | 348/143 |
| 2010/0246780 A1* | 9/2010 | Bakker et al. | 379/38 |
| 2010/0291894 A1* | 11/2010 | Pipes | 455/404.2 |
| 2011/0258266 A1* | 10/2011 | Serra et al. | 709/206 |

OTHER PUBLICATIONS

Request for Assistance Interface (RFAI) Specification, Intrado Inc, Longmont, Colorado USA, Specification Version 2.2, Documents IEN Voice 3.1 RFAI, pp. 1-59 Jun. 2009.

* cited by examiner

*Primary Examiner* — Mohamed Wasel
(74) *Attorney, Agent, or Firm* — Pearl Cohen Zedek Latzer, LLP

(57) ABSTRACT

A system and method for reconstructing a session. A method may include receiving audio and metadata packets related to a session. Audio data may be recorded and metadata information may be extracted from the metadata packets and stored in association with the audio data. A session may be reconstructed by simultaneously replaying the audio data and presenting a visual representation of the metadata.

14 Claims, 4 Drawing Sheets

METHOD AND SYSTEM FOR FOR RECONSTRUCTING A SESSION BY INTEGRATING METADATA AND DATA OF A SESSION

BACKGROUND

Next Generation 9-1-1 (NG9-1-1) is an initiative aimed at improving the current Emergency service infrastructure in the United States and Canada, mainly by improving public emergency communications services in a wireless mobile society. The need for an improved system was identified in the year 2000 by the National Emergency Number Association (NENA), the US Department of Transportation (DOT) has been leading the NG9-1-1 initiative, research and standards development since 2006.

NG9-1-1 is aimed at developing a public safety system capable of offering features unavailable in previous public safety systems. NG9-1-1 supports modern technologies such as voice over internet protocol (VoIP), wireless technologies such as Global System for Mobile (GSM) communication networks and mobile communication devices, and is further capable of providing extended information and capabilities to a public safety answer point (PSAP) and possibly on to emergency responder networks. For example, location information supported by cellular networks or global positioning systems (GPS) may be handled by NG9-1-1 systems.

However, while capable of handling various types of information, neither NG9-1-1 nor other systems offer a method or system for providing an integrated presentation and/or reconstruction of a session, for example, by simultaneously replaying audio data and visually presenting a caller's location.

SUMMARY OF THE INVENTION

Embodiments of the invention include a system and method for reconstructing a session. Embodiments may include receiving audio and metadata packets related to a session. Audio data may be recorded and metadata information may be extracted from the metadata packets and stored in association with the audio data. A session may be reconstructed by simultaneously replaying the audio data and presenting a visual representation of the metadata.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
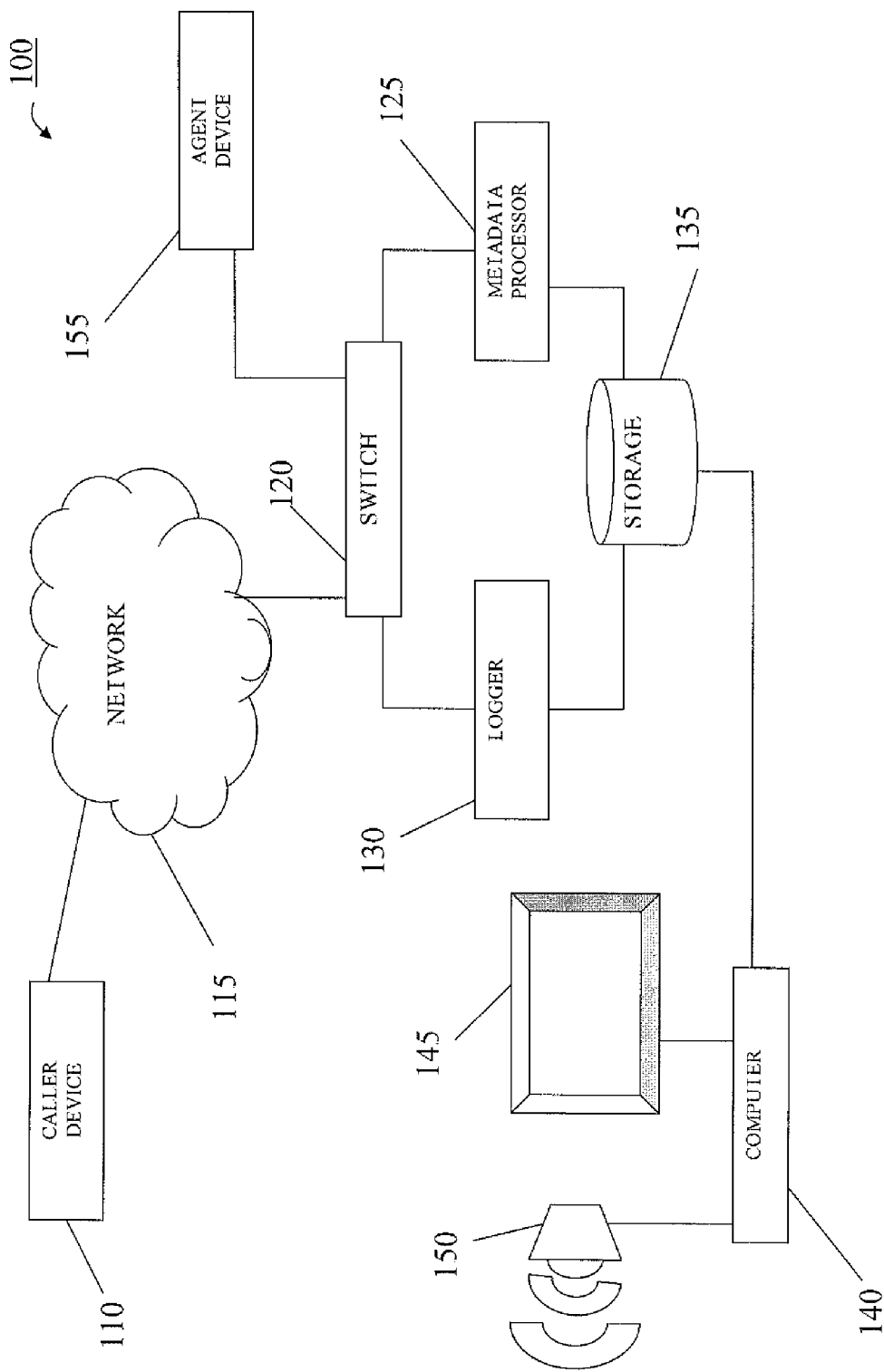
FIG. 1 shows a block diagram of an exemplary system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF DEMONSTRATIVE EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of devices" may include two or more devices.

Although embodiments of the invention are not limited in this regard, the terms "contact center", "call center" and/or "public safety answer point (PSAP)" as used herein may be used throughout the specification and claims to describe any centralized or distributed locations used for collective handling of multi-media information, for example, telephone calls, faxes, e-mails, web sessions and the like, or any other centralized or distributed locations used for the purpose of receiving, transmitting and controlling a large volume of information.

Although embodiments of the invention are not limited in this regard, the terms "call", "session" and/or "interaction" as used herein may be used throughout the specification and claims to describe a communication session, e.g., a request for assistance session or call that may be established between two or more humans or components, for example, a call or interaction may involve a device or component of a recording environment such as, VoIP telephone call, an instant messaging session, computer screen data, chat, video conference or any other multi-media session or interaction in a multi-media communication environment. The terms "call taker" and "agent" may refer to any person who is assigned the task of interacting or handling a session with callers, customers, clients or others who may call or otherwise interact with a PSAP, call center or relevant organization, facility, institution or business.

Current systems (e.g., NICE Inform® provided by NICE Ltd of ra'anana Israel) may be able to associate information such as a specific type of Automatic Location Information (ALI) by interfacing with dedicated databases or systems. In such and other systems, metadata related to a call or session is carried over, and/or provided by, dedicated systems, equipment and/or vendors, e.g., proprietary serial feeds. Accordingly, in the traditional infrastructure, metadata information is communicated or handled separately from the associated audio data.

In contrast, session initiation protocol (SIP) in a NG9-1-1 environment carries metadata that traditionally was carried on dedicated, separate systems. In NG9-1-1 systems, data exchanged in a request for assistance (RFA) session between a caller and a public safety answer point (PSAP) is carried over IP networks, using SIP for metadata information and real time protocol (RTP) for audio data. For example, metadata such as Presence Information Data Format-Location Object (PIDF-LO) which describes the location of the caller is embedded within SIP messages.

Accordingly, as defined by NG9-1-1, metadata may be obtained or received over the same network that communicates the audio data, namely, an IP network. However, remained to be solved is the problem of extracting relevant metadata information such as caller location from SIP messages and associating such extracted metadata information with the correct or relevant audio data and further enabling a correlated and/or synchronized presentation of both the metadata information and audio data, e.g., reconstructing a session at a call taker's workstation or on a remote computer by replaying the audio data and, concurrently or at the same time, presenting a synchronized visual representation of the caller location or other metadata relate to the call. For example, location information may be stored in association with the audio data is such that stored location information is correlated in time with recorded audio data. Accordingly, presenting a visual representation of the caller location in synchronization with a call may comprise dynamically updating the visual representation of the caller location such that the location of the caller at any point in time during the call may be presented and observed.

When embodiments of the invention are employed, no "equipment specific" integration is required since all data traversing the network (e.g., audio data and metadata) may be in a common format, e.g., carried by transmission control protocol (TCP) segments, real time protocol (RTP) packets or user datagram packets (UDP). Accordingly, a solution as enabled by embodiments of the invention may work for any NG9-1-1 compliant system, e.g., a NG9-1-1 PSAP as known in the art, and, as described herein, may enable reconstructing a session at a call taker's workstation or on a remote computer by replaying the audio data and, concurrently or at the same time, presenting a synchronized visual representation of the caller location or other metadata information.

Embodiments of the invention may enable reconstructing, reproducing, replaying or repeating a session such as a request for assistance (RFA) session or call by receiving one or more audio packets related to the session and receiving one or more metadata packets related to the session. Audio data in received audio packets may be recorded. Received metadata packets may be processed to extract any relevant metadata information therefrom, e.g., caller location information. Information extracted from metadata packets may be stored in association with the recorded audio data. Recorded audio data and associated stored metadata information may be used to reconstruct a session by replaying the audio data or content in the audio packets and, simultaneously or at the same time, presenting associated metadata information such as the caller location. For example, a computer equipped with a display and speakers may reconstruct a session by being provided with recorded audio data and associated stored metadata information and may simultaneously replay the audio data and visually or otherwise present the location of the caller on a map on a computer display screen. For example, a computer may concurrently replay the voices of a caller requesting help or assistance (e.g., a 9-1-1 caller) and an agent in a public safety answer point (PSAP), and, at the same time, present, on a display screen, metadata information associated with the session, e.g., the location of the caller requesting assistance.

Reference is now made to FIG. 1, which is a block diagram of an exemplary system 100 according to embodiments of the present invention. It should be understood to a person skilled in the art that the architecture of the exemplary system described herein does not limit the scope of the invention and embodiments of the invention may be implemented in other systems. System 100 may comprise a caller device 110, an agent device 155, a network 115, a switch 120, a logger 130, a metadata processor 125, a storage 135, a computer 140 and a display 145 and speaker 150 operatively connected to computer 140.

Caller device 110 may be any suitable communication device and may be used by a caller in order to establish and maintain a call or session. For example, caller device may be a mobile and/or cellular phone, a computer or a wire line telephone as known in the art. Accordingly, a request for assistance session may be initiated, established and maintained using caller device 110, e.g., by dialing a predefined sequence such as 9-1-1 using a keypad or pressing a speed-dial key and further using caller device 110 to converse with an agent in a PSAP. In other cases, caller device 110 may be any other computing and/or communication device, e.g., a personal digital assistant (PDA), a laptop or any other suitable device capable of communicating over network 115. Accordingly, caller device 110 may be, or may include parts of, a computing device and may accordingly include a memory, a controller, e.g., central processing unit processor (CPU), a monitor or display, a storage device, an operating system and any suitable input and output devices or components.

Network 115 may be, may comprise or may be part of a private or public IP network, e.g., the internet. Network 115 may also or in addition, be, comprise or be part of a global system for mobile communications (GSM) network. For example, network 115 may include or comprise an IP network such as the internet, a GSM related network and any equipment for bridging or otherwise connecting such networks as known in the art. In addition, network 115 may be, may comprise or be part of an integrated services digital network (ISDN), a public switched telephone network (PSTN), a public or private data network, a local area network (LAN), any combination of the preceding and/or any other suitable communication means. It will be recognized that embodiments of the invention are not limited by the nature of network 115.

Agent device 155 may be any suitable device, e.g., a telephone or other equipment used by, for example, agents in a call center. Logger 130 may be any suitable logging or recording system and may comprise a server, a plurality of recording and/or storage systems and/or any applicable components required in order to record any relevant data related to a session as described herein. According to embodiments of the invention, storage 135 may be any suitable storage device and/or system, e.g., a hard disk or a tape drive and may further comprise removable storage media such as a universal serial bus (USB) or compact disk (CD) storage devices. For example, logger 130 may be similar to the NICE VoIP Logger® as provided by NICE Ltd of ra'anana Israel or logger 130 and/or storage 135 may be as provided with one or more of NICE Perform®, NICE Inform®, NICE CLS® or Nice-Log® all provided by NICE Ltd of ra'anana Israel. Computer 140 may be any suitable computing device, e.g., a server, a personal or portable computer (PC) or a laptop. Display 145 may be any suitable display screen and speaker 150 may be any suitable speaker or audio system.

In some embodiments of the invention, network 115 may include or be part of an emergency services internet protocol network (ESINet) or components of an ESINet as known in the art. For example, an emergency services routing proxy (ESRP) may be included in network 115 and may participate in establishing a session between a caller and a PSAP. For example, a session between caller device 110 and agent device 155 may be established and/or maintained using services supplied by an ESRP in network 115. In particular, an ESRP in network 115 may handle SIP packets or perform any SIP related functionality as defined by this protocol and may further forward SIP or other messages to a PSAP. For example, possibly contained in SIP messages, an ESRP may forward information such as geo-location information or any other relevant calling party information to switch 120.

Network 115 may further enable communication of real time data. In a particular, real time protocol (RTP) packets may be communicated from a caller device to a PSAP, e.g., from caller device 110 to switch 120. In some cases and as known in the art, RTP packets containing audio data (e.g., a digital representation of human voices) may be communicated over a first channel or route, while metadata (e.g., related SIP messages) may be communicated over a second channel, route or path, for example, via an ESRP in network 115.

Data related to a session between caller device 110 and agent device 155 may be routed over network 115 to switch 120. Switch 120 may be any suitable network device capable of receiving, processing and forwarding network packets or traffic, possibly to a plurality of destinations. For example, switch 120 may support port mirroring or port monitoring as known in the art. In some embodiments, switch 120 may support the Switched Port Analyzer (SPAN) feature introduced by Cisco Systems, Inc. Accordingly, switch 120 may select received network traffic to be provided to, and processed or analyzed by, a designated destination, component, computer or entity. Switch 120 may forward network traffic to a plurality of destinations (e.g., using port mirroring as known in the art). For example, RTP packets carrying digitized human voice may be forwarded to agent device 155 and to logger 130 by switch 120. Accordingly, a conversation between a caller (e.g., using caller device 110) and an agent (e.g., using agent device 155) may be recorded (e.g., by logger 130) while it is in progress.

Switch 120 may selectively forward specific packets to a specific destination. For example, SIP messages received by switch 120 may be forwarded to metadata processor 125. Likewise, RTP packets or data in RTP packets may be forwarded to logger 130 and may further be recorded, e.g., on storage 135. It will be noted that although, for the sake of simplicity, not all possible interactions or connections between components of system 100 are shown, any required interaction or communication between such components may be possible. For example, metadata processor 125 may interact with logger 130 or a common management module (not shown) in order to associate storage of metadata information with storage of audio data. For example, parameters such as an internet protocol (IP) address, port number and the like may be exchanged or coordinated between metadata processor 125 and logger 130 such that metadata information extracted by metadata processor 125 from SIP messages may be associated with a channel used by logger 130 for recording the audio data of a session. Accordingly, session information or other metadata information extracted, generated or obtained by metadata processor 125 may be stored in association with audio data related to the same session.

In one embodiment of the invention, switch 120, metadata processor 125, logger 130, storage 135 and computer 145 with attached display 145 and speaker 150 may be part of, or located inside a call center or a PSAP. In other embodiments, some of these components may be located elsewhere or they may be distributed over a number of geographic locations. For example, while switch 120, metadata processor 125, logger 130 and storage 135 may be located in, or be part of a PSAP, computer 145 with attached display 145 and speaker 150 may be located in a remote site. Accordingly, reconstructing a session as described herein may be performed in any site or location, for example, by providing remote computer 145 with audio data and metadata information over a network or by copying such information onto a removable media and installing such media in remote computer 145. In other embodiments, computer 140 may be a PSAP call taker's workstation. Accordingly, a session may be reconstructed on the call taker's workstation at a PSAP.

As described herein, any relevant information may be extracted from network communications related to a session. For example, SIP messages containing Presence Information Data Format-Location Object (PIDF-LO) information may be forwarded to, and processed by, metadata processor 125. As known in the art, (PIDF-LO) may describe an exact location of a caller. Accordingly, metadata information extracted from SIP messages by metadata processor 125 may include location information. Accordingly, when reconstructing a session, the exact location of a caller may be visually displayed as further described herein (e.g., on display 145) while the call is being replayed (e.g., by speaker 150). For example, by dynamically updating an indication of a caller's location on a map on a computers display screen, based on location information extracted from SIP messages, a reconstruction of a session may comprise replaying the audio data (the parties voices) and, displaying the location of the caller at any point in time during the call.

Although the exemplary system 100 described herein comprises a number of components that may be separate physical entities, embodiments of the invention are not limited by such exemplary implementation. It will be understood that any distribution of functionalities or modules as described with respect to system 100 may be possible. For example, a single computer and storage system executing or implementing some or all functionalities of the NICE VoIP Logger® system (to substantially replace logger 130 and storage 135) and further executing or implementing some or all functionalities of the NICE Inform® system (to substantially replace computer 140 and attached display and speaker) and further executing or implementing a module similar to metadata processor 125 may be used in conjunction with switch 120 and agent device 155 in order to implement embodiments of the invention as described herein.

Figure 2:
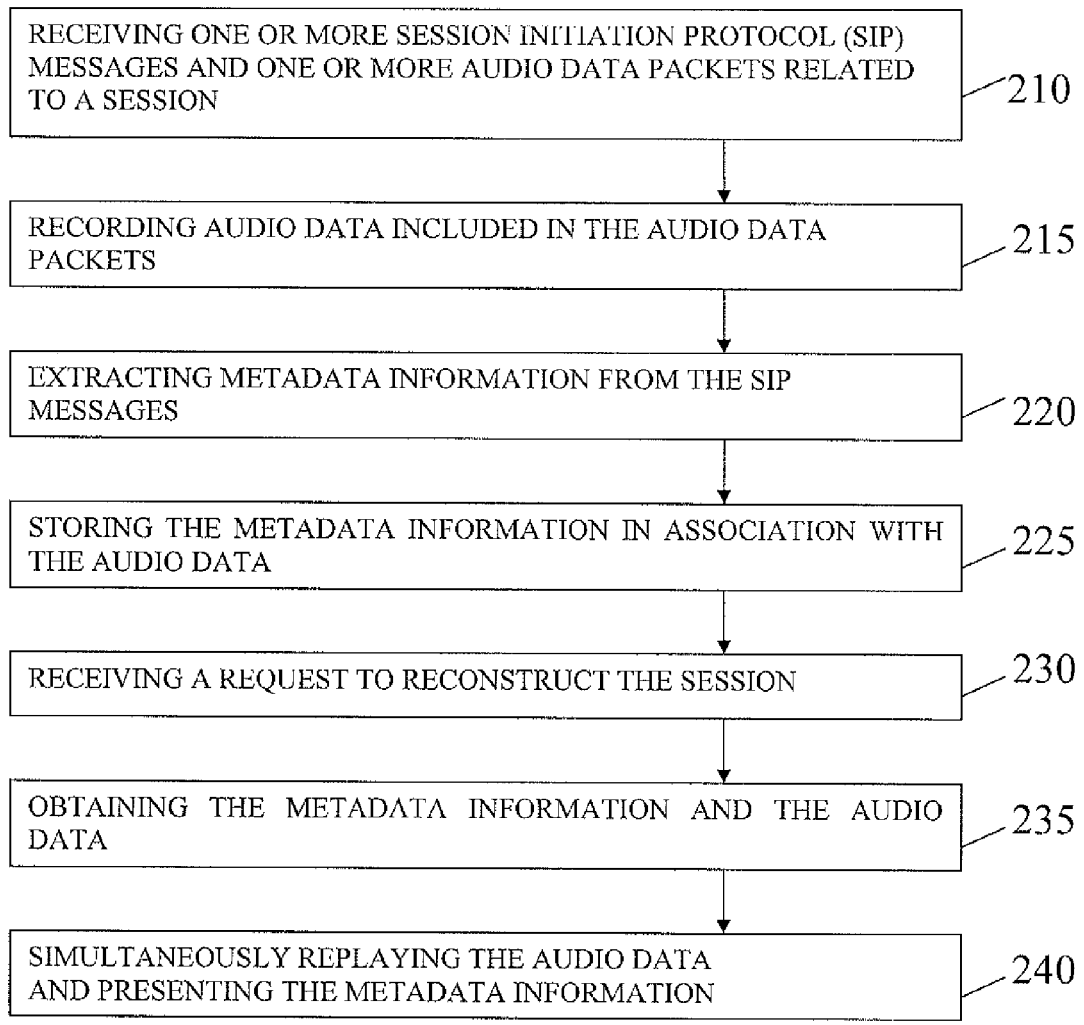
FIG. 2 shows an exemplary flowchart that may be used to implement embodiments of the invention.

Reference is made to FIG. 2 which is an exemplary flowchart describing a method according to embodiments of the invention. As shown by block 210, the flow may include receiving one or more SIP messages and one or more audio data packets related to a session. For example, a RFA session between a caller and a call taker or agent may comprise SIP messages and RTP packets as defined by NG9-1-1, such packets and messages may be received at a PSAP, e.g., by switch 120 shown in FIG. 1.

As shown by block 215, the flow may include recording audio data included in the audio data packets. For example, a NICE VoIP Logger® operatively connected to switch 120 may be used to record audio data carried by RTP packets. In some embodiments, such audio data may be provided to a recording system by a switch such as switch 120 that may route or forward the packets to the recording system, for example, by using port mirroring techniques, audio data may be provided to both a call taker (agent) in a PASP and a recording system or logger. In other embodiments, a recording system such as logger 130 may be made part of the session or call by using conferencing techniques as known in the art. In yet other embodiments, a network may be sniffed as known in the art and relevant packets may be extracted and provided to a recorder or logger. It will be recognized that embodiments of the invention are not limited by the way, method or implementation enabling recording of a call or session, for example, methods well known in the art such as conferencing, sniffing, routing for recording a call, e.g., in a call center, may be implemented by embodiments of the invention.

As shown by block 220, the flow may include extracting metadata information (such as location information of a caller) from the SIP messages. As described herein, SIP messages may be captured, e.g., by switch 120 as they arrive at a PSAP and may be further provided to a dedicated processor such as metadata processor 125. As described herein, SIP messages may be parsed and/or processed, e.g., by metadata processor 125 and any relevant data may be extracted therefrom. For example, the calling number, the called number and any geo-location information may be extracted. In addition, information that may be used in order to correlate or associate SIP metadata information with the audio data may be extracted. For example, an IP address and port related to the session (e.g., IP address and port identifying a TCP connection) may be extracted. Such parameters may be used in order to associate the metadata information with the audio data. For example, a recorder or logger channel may be associated with an IP address and port combination. Accordingly, metadata information and audio data may be mapped to a recorder channel using the IP address and port parameters.

As shown by block 225, the flow may include storing the metadata information (e.g., location information such as cartesian or other coordinates) in association with the audio data. As described herein, parameters such as an IP address and port may be used in order to associate metadata information with audio data. For example, a logger channel may be identified by, or related to, the corresponding IP address and port. Using the combination of an IP address and port, metadata processor 125 may associate extracted metadata information with the related audio data and cause a storage of the metadata information in association with the audio data. Tables, lists, pointers or other referencing techniques known in the art may be used in order to associate audio data and related metadata information such that they may be jointly retrieved and provided, namely, retrieval and presentation of audio data and metadata information related to the same session may be possible. For example, in some embodiments, the ANI/ALI tables used by NICE CLS® may be used in order to associate audio data and metadata information.

As shown by block 230, the flow may include receiving a request to reconstruct the session. For example, for the purpose of investigation, training, quality management or other reasons or purposes, a session may need to be reconstructed, replayed or repeated. In such case, a user may request to reconstruct, replay or repeat a session, possibly using tools known in the art such as a graphical user interface (GUI) tool that may list recorded sessions, e.g., sessions and/or their respective audio data and metadata information, stored in storage 135.

As shown by block 235, the flow may include obtaining the metadata information and the audio data related to a session. For example, upon receiving a request to reconstruct, replay or repeat a session, audio data and location information related to the session stored as described herein may be retrieved from a storage device and provided to a device capable of reconstructing, replaying or repeating the session. For example, a software module executed on computer 140 may request and receive audio data and related location or other metadata information from storage 135.

as shown by block 240, the flow may include simultaneously replaying the audio data and presenting the metadata information. For example, while replaying the audio data related to a session, a visual representation of the metadata may be displayed. For example, the location of the caller, the calling and/or called numbers and/or any other metadata may be displayed on display 145 while the voices of the caller, call taker and any other participants in the call or session may be reproduced by speaker 150. In some embodiments, a user may query the system that may be, for example, NICE CLS® in order to locate and or retrieve audio data and metadata information related to a session and may further be provided with a reconstruction of the session using the Inform Reconstruction Application of NICE Inform® system.

Figure 4:
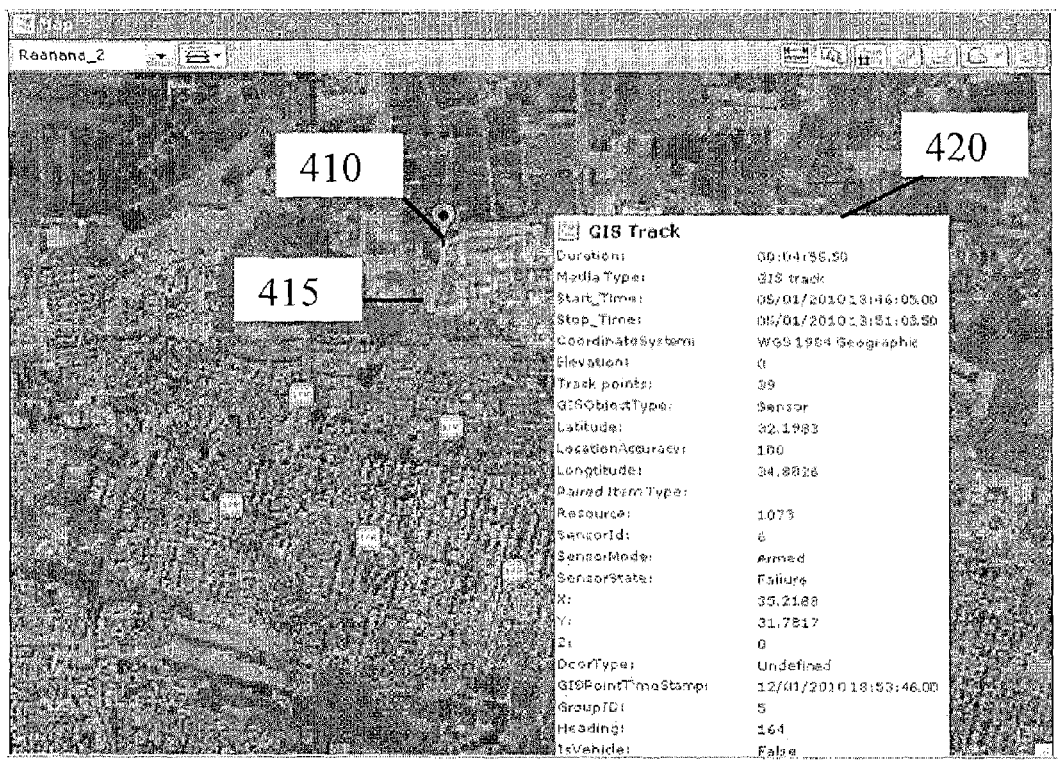
FIG. 4 shows an exemplary screen shot according to embodiments of the invention.

In some embodiments, geographic information system (GIS) technology as known in the art may be used or incorporated. As known in the art, GIS is a technology that enables merging cartography data with any relevant information. For example, a location of a caller may be indicated on a digital map. Accordingly, replaying the audio data and presenting the metadata information may comprise displaying a map on a computer display and showing or indicating relevant information on such map. Reference is additionally made to FIG. 4 showing an exemplary screen shot according to embodiments of the invention. As shown in FIG. 4, a map of a region related to a session may be displayed. As shown by 410, the location of a caller may be indicated on a displayed map. As shown by 415, a track traversed by the caller may be shown. As shown by 420, various information, e.g., a start time of a call, exact coordinates of the caller's location and the like may be shown in readable text or tabular format, for example, overlaid on the map.

In some embodiments, a visual representation of metadata, e.g., as shown in FIG. 4 may be dynamic. For example, a reconstruction or replay of a session may comprise dynamically updating a visual representation of metadata. For example, if a caller using a mobile phone is mobile during the call, e.g., driving a car or riding a train, then the a visual representation of metadata as shown by FIG. 4 may be updated in synchronization with the audio data. Accordingly, while listening to the conversation between a caller and a call taker, it may also be possible to see the actual location of the caller at any point in time during the call.

Figure 3:
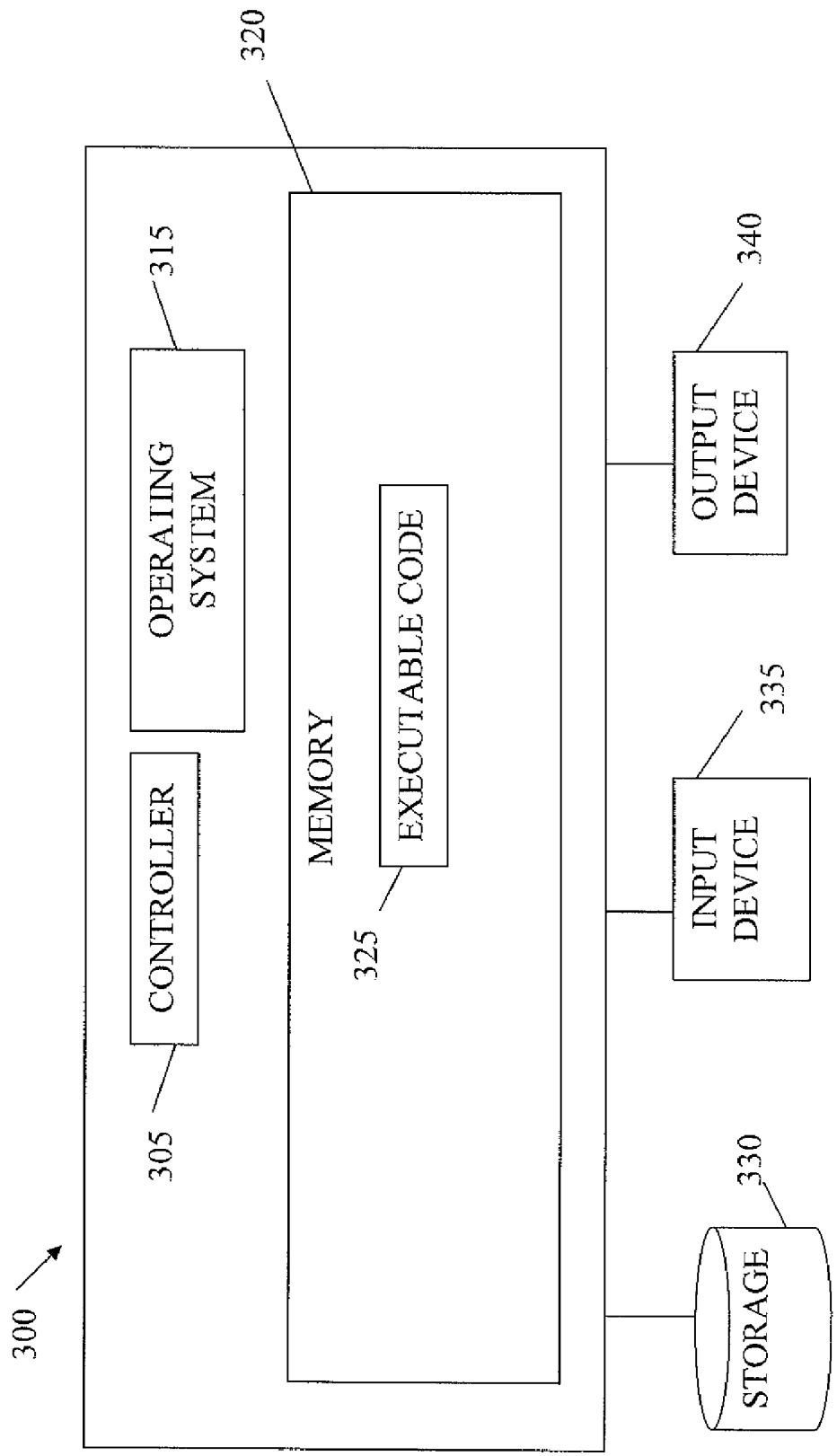
FIG. 3 shows a high level block diagram of an exemplary computing device according to embodiments of the present invention.

Reference is made to FIG. 3, showing high level block diagram of an exemplary computing device according to embodiments of the present invention. Computing device 300 may include a controller 305 that may be, for example, a central processing unit processor (CPU), a chip or any suitable computing or computational device, an operating system 315, a memory 320, a storage 330, an input device 335 and an output device 340.

Operating system 315 may be or may include any code segment designed and/or configured to perform tasks involving coordination, scheduling, arbitration, supervising, controlling or otherwise managing operation of computing device 300, for example, scheduling execution of programs. Operating system 315 may be a commercial operating system. Memory 320 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 320 may be or may include a plurality of, possibly different memory units.

Executable code 325 may be any executable code, e.g., an application, a program, a process, a task or a script. Executable code 325 may be executed by controller 305 possibly under control of operating system 315. Storage 330 may be or may include, for example, a hard disk drive, a floppy disk drive, a Compact Disk (CD) drive, a CD-Recordable (CD-R) drive, a universal serial bus (USB) device or other suitable removable and/or fixed storage unit. For example, executable code 325 may be a software implementation of metadata processor 125 described herein or may otherwise perform any functionalities as described with relation to metadata processor 125 as described herein.

Input devices 335 may be or may include a mouse, a keyboard, a touch screen or pad or any suitable input device. It will be recognized that any suitable number of input devices may be operatively connected to computing device 300 as shown by block 335. Output devices 340 may include one or more displays, speakers and/or any other suitable output devices. It will be recognized that any suitable number of output devices may be operatively connected to computing device 300 as shown by block 340. Any applicable input/output (I/O) devices may be connected to computing device 300 as shown by blocks 335 and 340. For example, a network interface card (NIC), a printer or facsimile machine, a universal serial bus (USB) device or external hard drive may be included in input devices 335 and/or output devices 340. According to embodiments of the invention, computer 140, metadata processor 125, logger 130, switch 120, caller device 110 and agent device 155 may comprise all or some of the components comprised in computing device 300 as shown and described herein.

Embodiments of the invention may include an article such as a computer or processor readable medium, or a computer or processor storage medium, such as for example a memory, a disk drive, or a USB flash memory, encoding, including or storing instructions, e.g., computer-executable instructions such as executable code 325, which when executed by a processor or controller, carry out methods disclosed herein. For example, a storage medium such as memory 320, computer-executable instructions such as executable code 325 and a controller such as controller 305. Some embodiments may be provided in a computer program product that may include a machine-readable medium, stored thereon instructions, which may be used to program a computer, or other programmable devices, to perform methods as disclosed above.

Embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components. In some embodiments, such system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computer-implemented method of reconstructing a session, the method comprising:
receiving one or more audio packets and one or more session initiation protocol (SIP) messages related to a request for assistance (RFA) session;
recording audio data included in the audio packets;
extracting location information from presence information within a SIP message and storing the location information in association with the audio data; and
reconstructing the RFA session by simultaneously replaying audio data and presenting a visual representation of the location information, wherein reconstructing the RFA session comprises dynamically updating the visual representation of a location of a caller in accordance with a progress of the RFA session.

2. The method of claim 1, wherein the one or more audio packets are real time protocol (RTP) packets.

3. The method of claim 1, wherein the one or more audio packets are received from an emergency services internet protocol network (ESInet).

4. The method of claim 1, wherein the one or more audio packets are received over a first network connection and the one or more SIP messages are received over a second network connection.

5. The method of claim 1, wherein the one or more SIP messages include a presence information data format location object (PIDF-LO) and wherein presenting a visual representation of location information comprises indicating a location of a caller associated with the RFA session on a map.

6. The method of claim 1, wherein receiving the one or more audio packets and one or more SIP messages is performed in a public safety answer point (PSAP).

7. The method of claim 1, wherein storing the location information in association with the audio data is such that stored location information is correlated in time with recorded audio data.

8. A system for reconstructing a session, the system comprising:
a storage system to store audio data related to a request for assistance (RFA) session;
a controller to:
receive one or more SIP messages related to the RFA session,
extract location information from presence information within a SIP message, and
cause storage of the location information in association with the audio data; and
a computer to receive the audio data and the location information and to reconstruct the RFA session by simultaneously replaying audio data and presenting a visual representation of the location information, wherein the computer is to reconstruct the RFA session by dynamically updating the visual representation of a location of a caller in accordance with a progress of the RFA session.

9. The system of claim 8, wherein the audio data is extracted from real time protocol (RTP) packets.

10. The system of claim 8, wherein the audio data is received from an emergency services internet protocol network (ESInet).

11. The system of claim 8, wherein the audio data is received over a first network connection and the SIP messages are received over a second network connection.

12. The system of claim 8, wherein the SIP messages include a presence information data format location object (PIDF-LO) and wherein presenting a visual representation of the location information comprises indicating a location of a caller associated with the RFA session on a map.

13. The system of claim 8, wherein the storage system and controller are located in a public safety answer point (PSAP).

14. The system of claim 8, wherein the controller is to cause storage of the location information such that stored location information is correlated in time with stored audio data.

* * * * *